(12) United States Patent
Cho (10) Patent No.: US 8,893,708 B2
(45) Date of Patent: Nov. 25, 2014

(54) PORTABLE BOILER FOR A HOT MAT

(75) Inventor: Ho Yong Cho, Incheon (KR)

(73) Assignee: Eurohousing Corporation, Bucheon-si, Gyeonggi-do (KR)

( * ) Notice: Subject to any disclaimer, the term of this patent is extended or adjusted under 35 U.S.C. 154(b) by 654 days.

(21) Appl. No.: 13/145,533

(22) PCT Filed: Feb. 11, 2010

(86) PCT No.: PCT/KR2010/000844
§ 371 (c)(1),
(2), (4) Date: Jul. 20, 2011

(87) PCT Pub. No.: WO2010/095828
PCT Pub. Date: Aug. 26, 2010

(65) Prior Publication Data
US 2011/0271915 A1   Nov. 10, 2011

(30) Foreign Application Priority Data
Feb. 17, 2009  (KR) ........................ 10-2009-0012985

(51) Int. Cl.
| | |
|---|---|
| F24H 1/14 | (2006.01) |
| F23D 14/28 | (2006.01) |
| F24H 9/20 | (2006.01) |
| F23N 5/02 | (2006.01) |
| F23N 1/08 | (2006.01) |
| F23D 99/00 | (2010.01) |
| F24D 3/12 | (2006.01) |
| F24H 1/12 | (2006.01) |
| F24H 1/06 | (2006.01) |

(52) U.S. Cl.
CPC  *F24D 3/12* (2013.01); *F23D 14/28* (2013.01); *F24H 9/2035* (2013.01); *F23N 5/027* (2013.01); *F23N 1/087* (2013.01); *F23D 21/005* (2013.01); *F24H 1/125* (2013.01); *F24H 1/06* (2013.01)
USPC ................ 126/210; 237/16; 237/17; 237/59; 237/62; 237/70; 237/71; 126/204; 126/208

(58) Field of Classification Search
CPC ...................................................... F24H 1/06
USPC ........... 122/DIG. 10, 14.31, 31.1, 37; 237/69, 237/16–19, 59, 62, 70, 71; 126/204, 208, 126/210; 607/108–111
See application file for complete search history.

(56) References Cited

U.S. PATENT DOCUMENTS 3,717,748 A *  2/1973  Imler ............................ 392/471
4,324,207 A *  4/1982  Leuthard .................... 122/14.22

(Continued)

FOREIGN PATENT DOCUMENTS

| JP | 04-34750 A | 12/1992 |
| JP | 05-071709 A | 3/1993 |

(Continued)

*Primary Examiner* — Steven B McAllister
*Assistant Examiner* — Ko-Wei Lin
(74) *Attorney, Agent, or Firm* — Sherr & Jiang, PLLC (57) ABSTRACT

The present invention relates to a portable boiler for a hot mat, which comprises: a water reservoir, one side of which has an inlet pipe for introducing water circulating through the hot mat, and which stores the water; a heat transfer unit in which the water discharged from the water reservoir flows along a flow channel pipe to be heat exchanged, wherein the water is discharged to the hot mat via an outlet pipe formed at one side thereof; a heating unit which burns the fuel gas fed from a fuel tank to heat the water in the heat transfer unit; and a housing which forms the outer appearance of the boiler.

12 Claims, 8 Drawing Sheets

(56) References Cited

U.S. PATENT DOCUMENTS

| | | | |
|---|---|---|---|
| 4,433,718 A * | 2/1984 | Bresin | 165/238 |
| 5,282,740 A * | 2/1994 | Okayasu | 431/344 |
| 5,454,428 A * | 10/1995 | Pickard et al. | 165/49 |
| 6,354,511 B1 * | 3/2002 | Hardee | 237/19 |
| 6,543,474 B2 * | 4/2003 | Fetterman, Jr. | 137/493.1 |
| 7,055,466 B2 * | 6/2006 | Long | 122/40 |
| 7,398,778 B2 * | 7/2008 | Kaiser | 126/101 |
| 7,635,004 B2 * | 12/2009 | Rudoy et al. | 137/70 |
| 8,528,833 B2 * | 9/2013 | Munson | 237/2 R |
| 2002/0096311 A1 * | 7/2002 | Kushnir et al. | 165/46 |
| 2005/0167080 A1 * | 8/2005 | Yoho | 165/48.1 |
| 2009/0145497 A1 * | 6/2009 | Takeda | 137/535 |

FOREIGN PATENT DOCUMENTS

| | | |
|---|---|---|
| KR | 10-0306289 B1 | 11/2001 |
| KR | 10-2009-0008174 A | 1/2009 |
| KR | 10-0876939 B1 | 1/2009 |

* cited by examiner

PORTABLE BOILER FOR A HOT MAT

TECHNICAL FIELD

The present invention relates to a portable boiler for a heating mat, and more particularly, to a portable boiler for a heating mat, which heats and circulates circulating water in the mat to maintain the mat at a desired temperature during camping for enjoying fishing and climbing at an outdoor place such as mountain, riverside, and seashore.

BACKGROUND ART

Generally, tents or sleeping bags are used for camping at outdoor places such as mountain, riverside, and seashore for climbing and fishing.

In this case, people lay a plastic or vinyl mat on the ground to interrupt chill and moisture from the ground.

Nevertheless, it is difficult to maintain the body temperature in a situation of severe cold such as winter climbing or alpine climbing. Unless the body temperature is appropriately maintained during camping, judgment and ability to cope with a crisis may be affected, causing a serious accident.

In order to overcome the above problems, Korea Utility Model Registration No. 207,192 and Korea Patent Registration No. 604,405 disclose a water heater for a heating mat and a portable boiler, respectively. However, since the water heater for the heating mat and the portable boiler do not include a separate temperature controller for controlling the temperature of circulating water that circulates in a heating mat and a hot water floor mat, a user may be burned by the circulating water of increasing temperature.

Also, since gas bubbles of high pressure generated during heating of the circulating water cannot be discharged and circulate along a pipe and a hot water hose together with the circulating water, the gas bubbles may hit against the inner surface of the pipe and the hot water hose, causing a noise.

DETAILED DESCRIPTION

Technical Problems

The present invention seeks to solve the above-mentioned problems, and provides a portable boiler for a heating mat, which can prevent a noise during circulation of circulating water in the heating mat and can selectively control the temperature of the circulating water.

The present invention also provides a portable boiler for a heating mat, which has a stable structure of using a portable fuel gas can that can be carried during camping such as climbing.

Technical Solutions

Embodiments of the present invention provide portable boilers for a heating mat, including: a water reservoir storing circulating water that is received through an inlet tube disposed on one side of an upper portion of the water reservoir; a heat-transfer part allowing the circulating water to flow along a flow passage to exchange heat and discharging the circulating water to the heating mat through an outlet tube disposed on one side of the heat-transfer part; a heating part for heating the circulating water inside the heat-transfer part by burning fuel gas supplied from a fuel tank; and a housing defining an exterior of the portable boiler, wherein: the water reservoir includes: the inlet tube connected to one and of a circulation pipe buried in the heating mat on the one side of the upper portion of the water reservoir; a fixing bracket having a plurality of holes to allow the circulating water to flow into the heat-transfer part; a check valve formed of a thin film and opening/closing the plurality of holes according to a water pressure of the circulating water; and a temperature sensor sensing a temperature of the circulating water to generate a physical signal using expansion and contraction of a liquid filled therein; the heat-transfer part has the flow passage that allows the circulating water to absorb heat when the check valve is opened and the circulating water flows therein; and the heating part includes: a gas controller for controlling an injection amount of the fuel gas supplied from the fuel tank; a controller receiving the physical signal from the temperature sensor to control the gas controller; and an igniter including a combustor for burning the fuel gas supplied from the gas controller and a spark plug generating an electric spark on the combustor.

In some embodiments, the portable boiler may further include a heat-collecting plate on an undersurface of the heat-transfer part to increase thermal conductivity.

In other embodiments, the portable boiler may further include a plurality of heat-collecting fins radially disposed from a center of the heat-collecting plate to the outside.

In other embodiments, the gas controller may include: a coupling part coupled to the fuel tank; a support block including a first fuel discharging tube allowing the fuel gas supplied from the fuel tank to be ejected through a first fuel discharging hole; a first cylinder assembly mounted with a first piston that moves in a cylinder due to a rotation of a control knob screwed into a control screw part formed in the cylinder to open and close the first fuel discharging tube, and disposed on the support block to communicate with the first fuel discharging tube; and a second cylinder assembly mounted with a second piston that moves slidably moves in a cylinder to open and close a second fuel discharging tube, and disposed on the support block to communicate with the first cylinder assembly and discharge the fuel gas received through the second discharging tube; the controller may include: a movement member abutting on an end portion of the second piston of the second cylinder assembly to move the second piston by expanding or contracting due to the physical signal generated by the temperature sensor; and a location controller for controlling a location of the movement member; the combustor may burn the fuel gas received through the second fuel discharging hole of the second cylinder assembly; and the igniter may include the spark plug generating the electric spark on the combustor.

In still other embodiments, the flow passage of the heat-transfer part may include: a vertical flow passage to which the circulating water first flows through the check valve of the water reservoir; a bypass flow passage detouring the circulating water from the vertical flow passage to one side; an inclination flow passage communicating with the bypass flow passage and inclining toward the outlet tube.

In even other embodiments, the portable boiler may further include a space part defined by a support bracket disposed between the flow passage and the heat-collecting plate of the heat-transfer part to support the flow passage and the heat-collecting plate of the heat-transfer part.

In yet other embodiments, the portable boiler may further include a shield plate disposed between the inclination flow passage and the bypass flow passage of the heat-transfer part to prevent heat transferred from the heat-collecting plate from being transferred to the water reservoir through the flow passage.

In further embodiments, the check valve may be formed using a flexible silicon thin-film and may be coupled to one end of a rise and fall rod penetrating a center of the fixing bracket, and an elastic member may be disposed around an outer circumferential surface of the rise and fall rod and may be supported by the other end of the rise and fall rod and the fixing bracket.

In still further embodiments, the temperature sensor may include: a signal generation part submerged in the water reservoir and generating a physical signal that allows expansion and contraction using a liquid filled therein when the temperature of the circulating water loaded in the water reservoir reaches a certain temperature; and a signal delivery part including a capillary tube filled with the liquid to deliver the physical signal to the movement member.

In even further embodiments, the fixing bracket may have an ejection hole for discharging vapor generated when the circulating water flows in the heat-transfer part and may include an air ejector that opens the ejection hole when a pressure of the vapor becomes greater than a certain pressure.

In yet further embodiments, the portable boiler may further include a pressurizing member that has a rod shape and allows the rise and fall rod to be manually pushed from the outside.

In much further embodiments, the housing may have a plurality of first air passages at a location of an outer circumferential surface thereof corresponding to the bypass flow passage of the heat-transfer part in an outer circumferential surface of the housing and a plurality of air passages at a location of the outer circumferential surface thereof corresponding to the heat-collecting plate.

In still much further embodiments, the portable boiler may further include an auxiliary cover in the housing corresponding to the first air passages. Here, the auxiliary cover has a plurality of auxiliary air passages that selectively open and close the first air passages.

In even much further embodiments, the portable boiler may further include a windproof plate outside the housing corresponding to the second air passages, the windproof plate preventing a direction of a flame from being biased according to a flow of air received through the second air passages.

In even much further embodiments, the second piston of the second cylinder assembly may have a recessed groove on a front end thereof such that a very small amount of fuel flows into the second cylinder assembly even when the fuel discharging tube of the second cylinder assembly is closed, and the second fuel discharging tube of the second cylinder assembly may have a recessed groove in an inner circumferential surface thereof such that a very small amount of fuel flows into the second cylinder assembly even when the fuel discharging tube of the second cylinder assembly is closed.

In yet much further embodiments, the location controller may include: an elastic frame supporting the movement member while being fixed on one side of the support block; a fixing frame coupled to the other side of the support block, and a location control lever including a control bolt penetrating the fixing frame and screwed into the elastic frame at one end thereof, and a grip for rotating the control bolt at the other end thereof, and a control nut may be further provided between the fixing frame and the elastic frame to be coupled to the control bolt and be fixed on the elastic frame.

BEST MODES FOR PRACTICING INVENTION

Exemplary embodiments of the present invention will be described below in more detail with reference to the accompanying drawings. The present invention may, however, be embodied in different forms and should not be construed as limited to the embodiments set forth herein. Rather, these embodiments are provided so that this invention will be thorough and complete, and will fully convey the scope of the present invention to those skilled in the art.

Hereinafter, exemplary embodiments of the present invention will be described in detail with reference to the accompanying drawings.

These embodiments and the drawings are not intended to limit the technical scope of the present invention but to facilitate a better understanding of the present invention.

Figure 1:
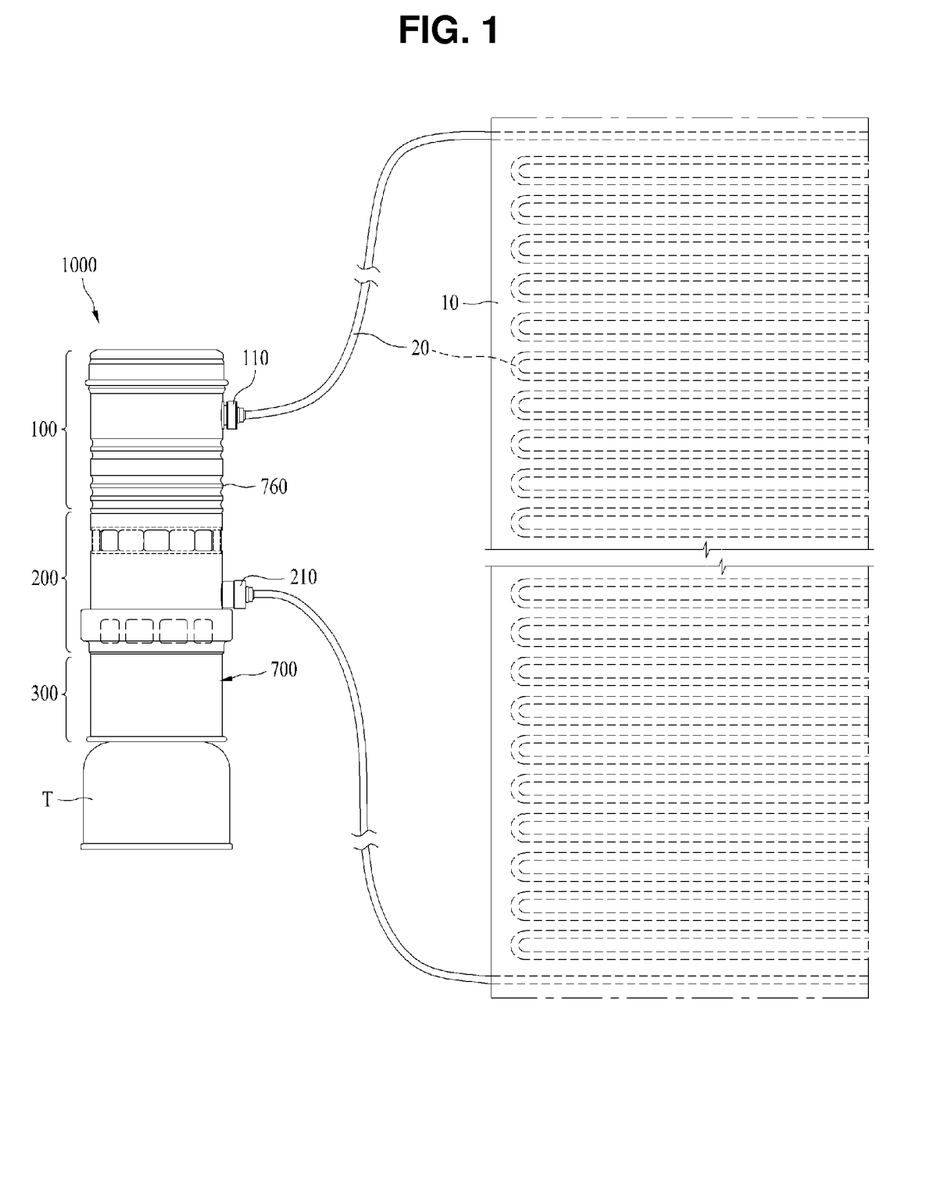
FIG. 1 is a schematic view illustrating the exterior of a portable boiler for a heating mat and the heating mat according to an exemplary embodiment of the present invention.

FIG. 1 is a schematic view illustrating the exterior of a portable boiler for a heating mat and the heating mat according to an exemplary embodiment of the present invention.

A portable boiler 1000 for a heating mat 10 includes a water reservoir 100, a heat transfer part 200, a heating part 300, and a housing 700. The water reservoir 100 stores circulating water. An inlet tube 110 is formed on one side of the upper portion of the water reservoir 100 to receive the circulating water that circulates in the heating mat 10. The circulating water discharged from the water reservoir 100 flows along a flow passage to perform heat-exchange, and then may be discharged into the heating mat 10 through an outlet tube 210 disposed on one side of the heat-transfer part 200. The heating part 300 heats the circulating water inside the heat-transfer part 200 by burning a fuel gas supplied from a fuel tank T. The housing 700 defines the exterior of the portable boiler 1000. The circulating water discharged from the heating mat 10 flows into the portable boiler 1000 through the inlet tube 10, and is heated during the flowing along the flow passage. Thereafter, the circulating water is again discharged into the heating mat 10 through the outlet tube 210.

Although not shown in FIG. 1, the portable boiler 1000 further includes a temperature sensor 140, a gas controller 400, and a controller 500. The temperature sensor 140 senses the temperature of the circulating water to generate a physical signal using expansion and contraction of a liquid filled therein. The gas controller 400 controls an injection amount of the fuel gas supplied from the fuel tank. The controller 500 receives the physical signal from the temperature sensor 140 to control the gas controller 400.

A wrinkled part 760 is formed on the housing 700 corresponding to the water reservoir 100 to facilitate the cooling of the circulating water flowing into the water reservoir 100 and reinforce the strength of the housing 700.

A plurality of first air passages 710 are disposed in the outer circumferential surface of the housing 700 corresponding to a location of a bypass flow passage 205 of the heat-transfer part 200. The plurality of first air passages 710 supply air to perform air-cooling such that the bypass flow passage 205 and a vertical flow passage 203 of the heat-transfer part 200 are not overheated by heat transferred from an inclination flow passage 207.

A plurality of second air passages 720 are disposed on a location corresponding to a heat-collecting plate 250. The plurality of second air passages 720 discharge gases and heat generated during the combustion of the fuel gas triggered by an igniter 600 described later.

When the air flow rate through the second air passages 720 is excessively high, the direction of flame is biased according to the air flow. Accordingly, a windproof plate 750 is further provided to prevent the above limitation.

An auxiliary cover 740 is mounted in the housing 700 corresponding to the first air passages 710. The auxiliary cover 740 has a plurality of auxiliary air passages 743 formed therein to selectively open and close the first air passages 710. The auxiliary cover 740 may serve to prevent reduction of the thermal efficiency when the temperature of the heat-transfer part 200 is excessively reduced due to external air of significantly low temperature received through the first air passages 710.

The auxiliary cover 740 having the auxiliary air passages 743 is used by appropriately adjusting a location thereof relative to that of the first air passages 710 according to the surrounding environment.

Hereinafter, the structure and operation of the portable boiler for the heating mat of FIG. 1 will be described in more detail with reference to FIGS. 1 through 6.

Figure 2:
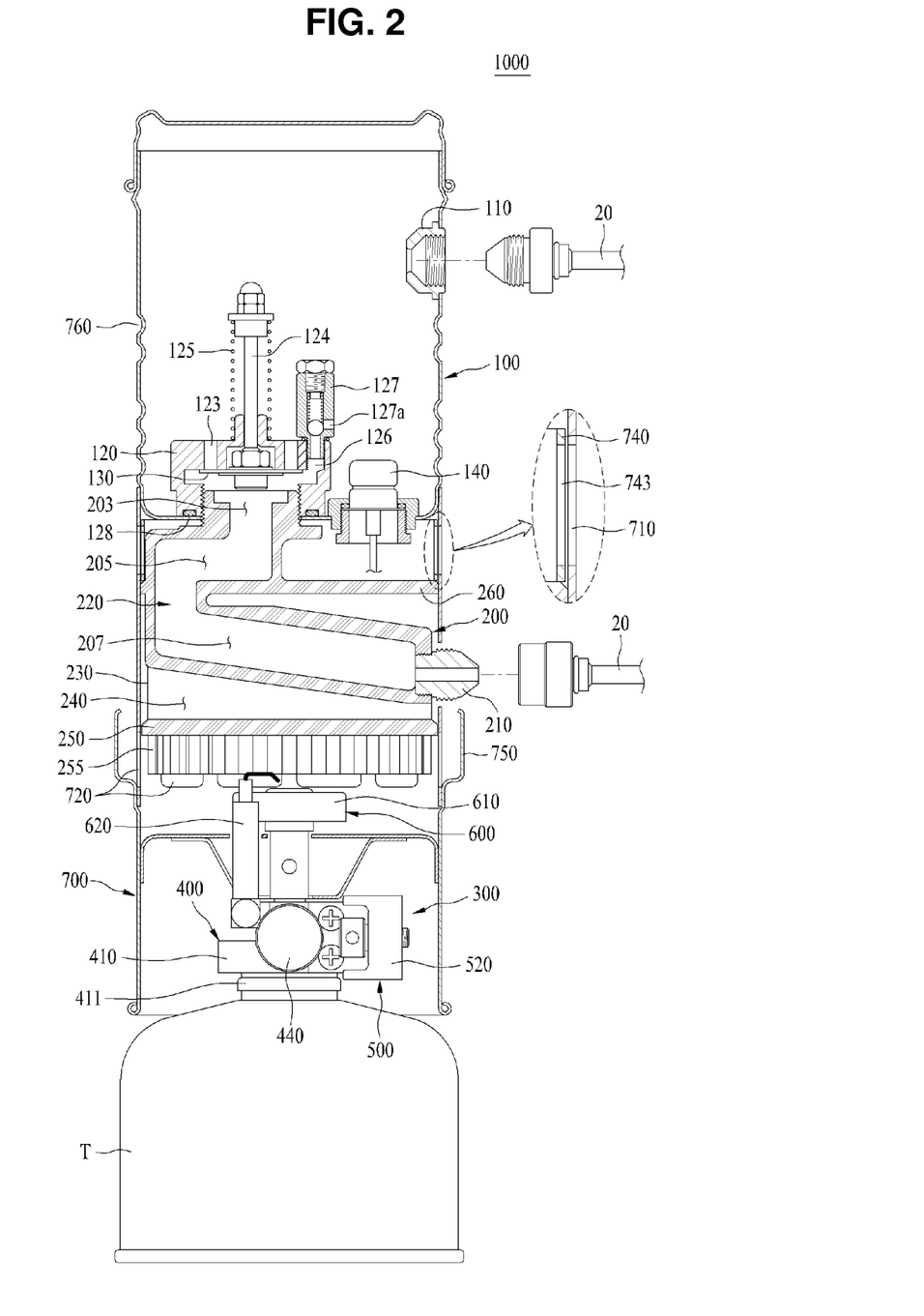
FIG. 2 is a cross-sectional view illustrating the overall structure of a portable boiler for a heating mat according to an exemplary embodiment of the present invention.

FIG. 2 is a cross-sectional view illustrating the overall structure of a portable boiler for a heating mat according to an exemplary embodiment of the present invention.

As shown in FIG. 2, the housing 700 defining the exterior of the portable boiler houses the water reservoir 100, the heat-transfer part 200, and the heating part 300 from top to bottom. Although shown as partitioned into three parts, the housing 700 is formed using one member as a whole.

The water reservoir 100 includes an inlet tube 110, a fixing bracket 120, a check valve 130, and a temperature sensor 140. The inlet tube 110 is disposed on the right upper portion of the water reservoir 100 to be connected to one end of the circulation pipe 20 buried in the heating mat 10. The fixing bracket 120 has a plurality of holes 123 to allow the circulating water to flow into the heat-transfer part 200. The check valve 130 may open and close the plurality of holes 123 according to a water pressure of the circulating water. The check valve 130 is formed of a flexible silicon thin-film. The temperature sensor 140 senses the temperature of the circulating water to generate a physical signal using expansion and contraction of a liquid filled therein. The check valve 130 is coupled to one end of a rise and fall rod 124 penetrating the center of the fixing bracket 120. Also, a spring is provided on the outer circumferential surface of the rise and fall rod 124 that are supported by the other end of the rise and fall rod 124 and the fixing bracket 120. Although the spring 125 is exemplified in the present embodiment, other elastic members that can be restored when a compressive force is removed may be used.

To explain the operation of the water reservoir 100, it will be assumed that circulating water is not included at all in the water reservoir 100 at the initial stage.

When an upper cover forming a portion of the housing 700 is opened and then circulating water is inputted, the check valve 130 has to be opened to allow the circulating water to flow into the heating mat 10 through the outlet tube 210. Since the check valve 130 is formed of a silicon thin film, the check valve 130 is closed until the circulating water received in the water reservoir 100 have a certain water pressure. Accordingly, the rise and fall rod 120 may be manually moved downward. The spring 125 is wound around the outer circumferential surface of the rise and fall rod 124, and the both ends thereof are supported by the one end of the rise and fall rod 124 and the fixing bracket 120. Accordingly, when a compressive force is removed, the rise and fall rod 124 may move upward to close the check valve 130.

In this case, the gas fuel supplied from the fuel tank T needs not to be ignited.

The check valve 130 is forcibly opened for a certain time to allow the circulating water to flow into the heating mat 10. When the rise and fall rod 124 is released, the check valve 130 is opened and closed only by the water pressure of the circulating water including in the water reservoir 100. When the check valve 130 is opened, the circulating water discharged through the holes 123 formed in the fixing bracket 120 flows into the heat-transfer part 200.

Hereinafter, the fixing bracket 120, the rise and fall rod 124, the check valve 130, and an air ejector 127 will be described in detail with reference to FIG. 3.

Figure 3:
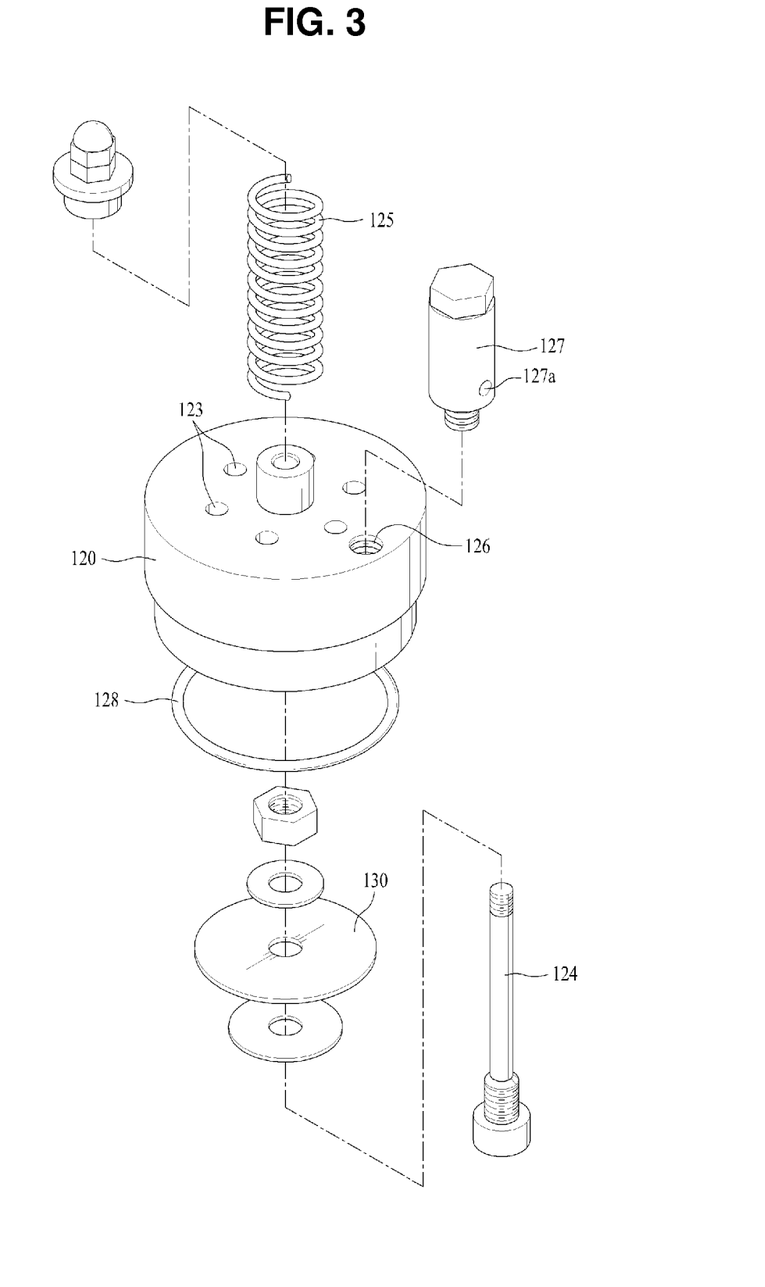
FIG. 3 is an exploded perspective view illustrating a fixing bracket, a rise and fall rod, a check valve, and an air ejector, which are mounted on a water reservoir according to an exemplary embodiment of the present invention.

FIG. 3 is an exploded perspective view illustrating the fixing bracket 120, the rise and fall rod 124, the check valve 130, and the air ejector 127 that are mounted in the water reservoir 100.

As shown in FIG. 3, the holes 123 having a certain depth are radially formed in the fixing bracket 120. When the check valve 130 is opened, circulating water flows through a hollow space of the fixing bracket 120. A female screw is disposed under the fixing bracket 120 to couple the fixing bracket 120 to the vertical flow passage 203 of the heat-transfer part 200.

The check valve 130 is disposed under the holes 123 of the fixing bracket 120 to allow the holes to be opened when the check valve 130 sinks down due to the water pressure of the circulating water included in the water reservoir 100.

In this case, a rubber packing 128 is disposed under the fixing bracket 120 to prevent a water leakage between the fixing bracket 120 and the heat-transfer part 200.

A stepped hole is formed in the center of the fixing bracket 120 to allow the rise and fall rod 124 to penetrate therethrough. One end of the spring 125 wound around the outer circumferential surface of the rise and fall rod 124 is supported by the stepped portion.

As described above, the rise and fall rod 124 is used to load circulating water at the initial stage of the operation. When the rise and fall rod 124 is pushed, the check valve 130 coupled to the end portion of the rise and fall rod 124 is forcibly opened. When the pushing force is removed, the check valve 130 is again closed by a resilient force of the spring 125.

An ejection hole 126 is further formed in an outermost portion of the fixing bracket 120. The air ejector 127 is screwed into the ejection hole 126.

The ejection hole 126 of the air ejector 127 is provided to discharge vapor generated during flowing of the circulating water in the heat-transfer part 200. When the vapor has a certain pressure, the vapor pushes up a ball blocking the ejection hole 126 to be discharged into the water reservoir 100 through an air outlet 127*a*.

Since vapor generated from the heat-transfer part 200 is compressible unlike water, the vapor has to be removed because of small volume but high pressure. Thus, noise and danger of explosion generated during the circulation along the heating mat 10 can be prevented.

Although not shown, a pressurizing member having a rod shape is further disposed such that the rise and fall rod 124 can be manually pushed from the outside. The pressurizing member may abut on the head of the rise and fall rod 124.

Hereinafter, a configuration of the heat-transfer part 200 will be described in more detail with reference to FIG. 4.

Figure 4:
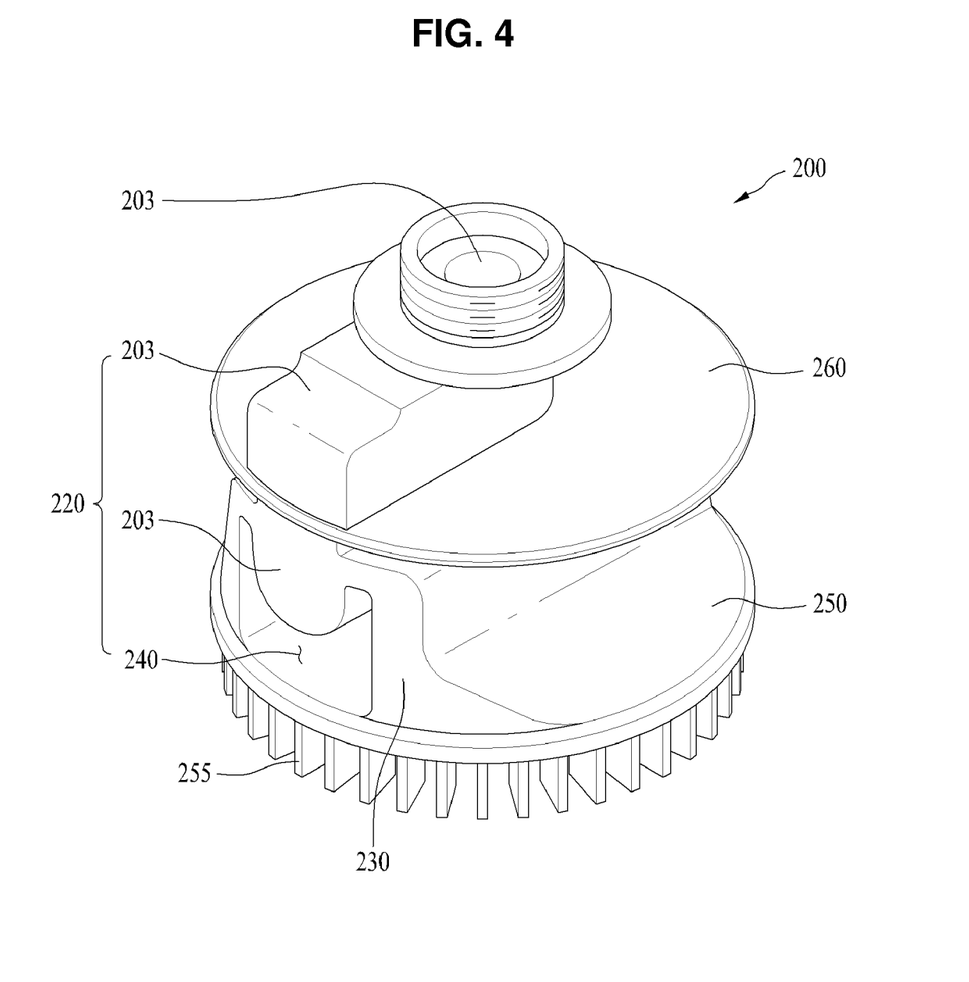
FIG. 4 is a perspective view illustrating a configuration of a heat-transfer part according to an exemplary embodiment of the present invention.

FIG. 4 is a perspective view illustrating the configuration of the heat-transfer part 200.

As shown in FIG. 4, the flow passage 220 is provided in the heat-transfer part 200 to allow the circulating water to absorb heat when the check valve 130 of the water reservoir 100 is opened and the circulation water flows therethrough.

The water passage 220 includes a vertical flow passage 203, a bypass flow passage 205, and an inclination flow passage 207. The vertical flow passage 203 first receives the circulating water through the check valve of the water reservoir 100. The vertical flow passage 203 includes a male screw that is coupled to the lower end of the fixing bracket 120 of the water reservoir 100 through a screw-coupling. The bypass flow passage 205 detours the circulating water received from the vertical flow passage 203 to one side. The inclination flow passage 207 communicates with the bypass flow passage 205, and has an inclined flow passage toward the outlet tube 210.

The bypass flow passage 205 prevents air bubbles generated by a sudden vaporization of the circulating water received from the vertical flow passage 203 when the circulating water vertically drops on the bottom heated at a high temperature.

Also, the inclination flow passage 207 toward the outlet tube 210 increases a heat-transfer area and prevents a sudden vaporization of the circulating water, thereby facilitating the circulation of the circulating water.

A heat-collecting plate 250 having a circular shape is attached to the undersurface of the heat-transfer part 200 to increase the thermal conductivity from the heating part 300 to the flow passage 220. The heat-collecting plate 250 includes a plurality of heat-collecting fins 255 that are radially disposed from the center of the heat-collecting plate 250 to the outside.

A support bracket 230 is disposed between the flow passage 220 (inclination flow passage 207 to be exact) and the heat-collecting plate 250 to support the flow passage 220 (inclination flow passage 207 to be exact) and the heat-collecting plate 250. The support bracket 230 secures a space part 240 between the heat-collecting plate 250 and the flow passage 220. Thus, heat transfer from the heat-collecting plate 250 to the flow passage 220 is achieved by convection through the space part. Heat transfer from the heat-collecting plate 250 to the upper portion of the inclination flow passage 207 is achieved by conductivity through the support bracket 230. Since the support bracket 230 extends from the upper portion of the inclination flow passage 207, the thermal transfer at the bottom of the inclination flow passage 207 is performed by convection through the space part 240. Accordingly, a sudden vaporization that is generated on the bottom of the inclination flow passage 207 is prevented in advance.

A shield plate 260 is disposed between the inclination flow passage 207 and the bypass flow passage 205 of the heat-transfer part 200 to prevent heat transferred from the heat-collecting plate 250 from being transferred to the water reservoir 100 through the flow passage 220. The shield plate 260 prevents the temperature of the circulating water entering the heating mat 10 from rising above a desired temperature when the circulating water inside the water reservoir 100 is heated by the heat-transfer part 200.

Hereinafter, a mechanism of sensing the temperature of the circulating water loaded in the water reservoir 100 and controlling the amount of fuel gas supplied from the fuel tank T according to the temperature of the circulating water will be described in detail with reference to FIGS. 5 and 6.

Figure 5:
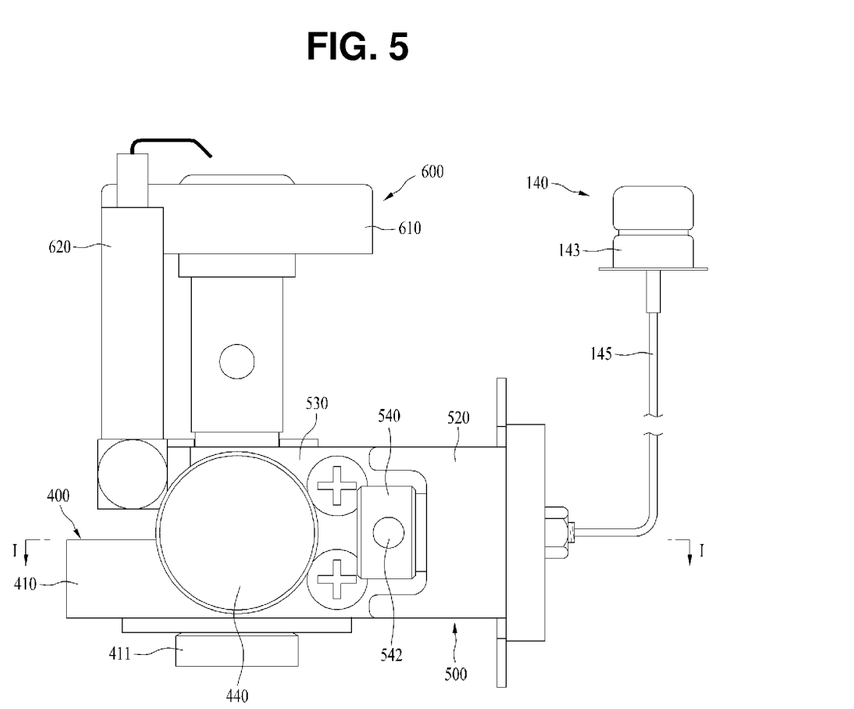
FIG. 5 is a front view illustrating the exterior of a heating part according to an exemplary embodiment of the present invention.

FIG. 5 is a front view illustrating the exterior of the heating part 300.

As shown in FIG. 5, the heating part 300 includes a gas controller 400, a controller 500, and an igniter 600. The gas controller 400 adjusts an ejection amount of fuel gas supplied from the fuel tank T. The controller 500 receives a physical signal of expansion or contraction generated from the temperature sensor 140 to control the gas controller 400. The igniter 600 includes a combustor 610 for burning fuel gas received through a second fuel discharging hole 414a of a second cylinder assembly 430, and a spark plug 620 for generating an electric spark on the combustor 610.

Figure 6:
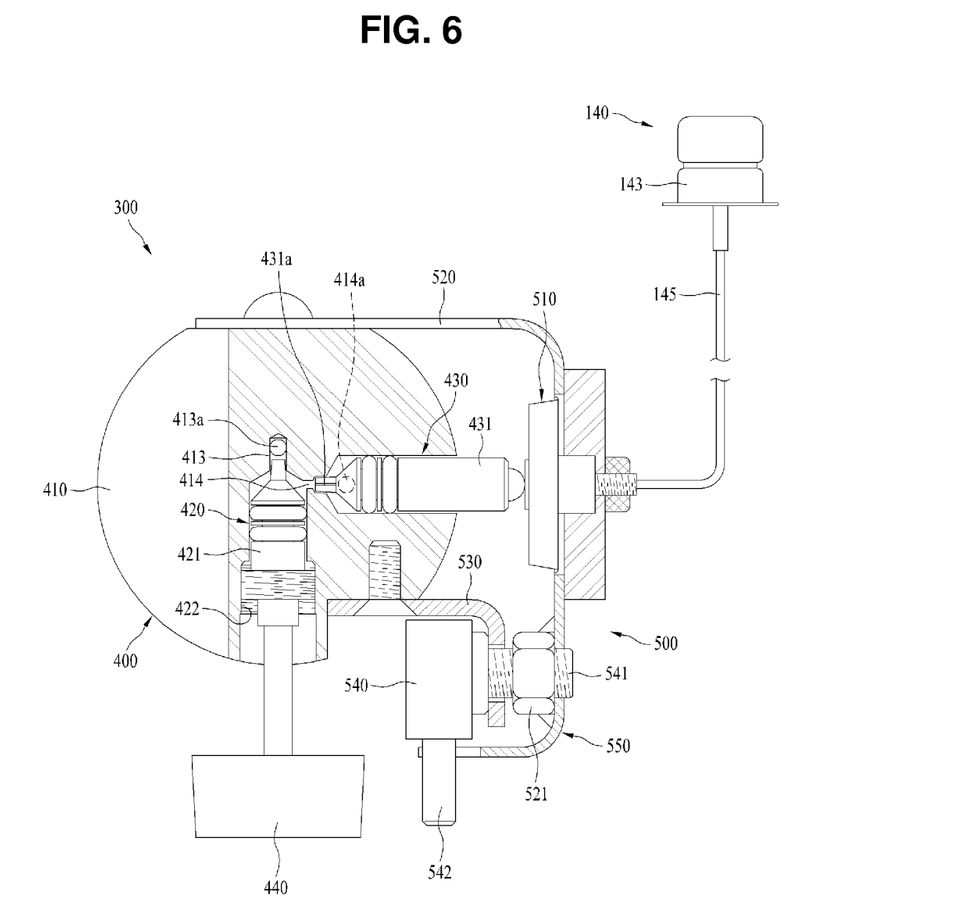
FIG. 6 is a cross-sectional view taken along line I-I, which illustrates an interaction between a temperature sensor and a heating part according to an exemplary embodiment of the present invention.

FIG. 6 is a cross-sectional view taken along line I-I, which illustrates an interaction between the temperature sensor 140 and the heating part 300.

As shown in FIG. 6, the temperature sensor 140 may include a signal generation part 143 and a signal delivery part 145. The signal generation part 143 is disposed in the water reservoir 100, and senses the temperature of the circulating water loaded in the water reservoir 100 to generate a physical signal by expansion or contraction of a liquid filled therein according to the temperature of the circulating water. The signal delivery part 145 is formed using a capillary tube to deliver the physical signal generated by the signal generation part 143 to the controller 500 (a movement member 510) of the heating part 300.

The physical signal generated in the signal generation part 143 refers to an expansive force or a contractile force of a liquid filled in the signal generation part 143. Accordingly, when the temperature of the circulating water in the water reservoir 100 rises above a certain temperature, the liquid filled therein may expand to deliver an expansive force to the movement member 510. Due to the expansion of the movement member 510, a second piston 431 moves to the left side on the drawing, closing a second fuel discharging tube 414.

On the other hand, based on the principle that the specific volume of a liquid is reduced when the temperature of the circulating water in the water reservoir 100 becomes smaller than a certain temperature, a second fuel discharging tube 414 is opened. This is because the pressure of fuel gas from the first cylinder assembly 420 to the second fuel discharging tube 414 moves the second piston 431 to the left side of the drawing.

Since the signal delivery part 145 is formed using a capillary tube, a fine change of the specific volume of the liquid is changed into a change of the pressure to be delivered to the movement member 510.

The liquid filled in the temperature sensor 140 is not limited to a specific material. For example, if there is a change of the specific volume according to the temperature thereof, other materials can be applied.

Hereinafter, the configuration of the heating part 300 will be described in detail with reference to FIG. 6.

The gas controller 400 includes a support block 410, a first cylinder assembly 420, and a second cylinder assembly 430. The support block 410 includes a coupling part 411 coupled to the fuel tank T, and a first fuel discharging tube 413. The fuel gas supplied from the fuel tank T is ejected through a first fuel discharging hole 413a of the first fuel discharging tube 413. The first cylinder assembly 420 includes a first piston 421 opening and closing the first fuel discharging tube 413 by moving in the cylinder due to a rotation of a control knob 440 that is screwed into a control screw part 422 formed in the cylinder. The first cylinder assembly 420 is disposed on the support block 410 to communicate with the first fuel discharging tube 413. The second cylinder assembly 430 includes a second piston 431 for opening and closing the second fuel discharging tube 414 by slidably moving therein and is formed on the support block 410 to communicate with the first cylinder assembly 420. The second cylinder assembly 430 has the second discharging hole 414a for discharging the fuel gas received through the second fuel discharging tube 414.

The first and second assemblies 420 and 430 are disposed on the support block 414.

The cylinder assemblies 420 and 430 includes the first and second fuel discharging tubes 413 and 414, the first and second fuel discharging holes 413a and 414a, and the first and second pistons 421 and 431, respectively.

The first cylinder assembly 420 manually controls the amount of fuel gas ejected from the fuel tank T. The first cylinder assembly 420 controls the opening degree of the first fuel discharging tube 413 using movement of the first piston 421 due to the rotation of the control knob 440 that is screwed into the control screw part 422 formed in the cylinder.

On the other hand, the second cylinder assembly 430 controls the amount of fuel gas necessary to heat the heat-transfer part 200. The second cylinder assembly 430 sends the fuel gas to the combustor 610 of the igniter 600.

Since the second cylinder assembly 430 communicates with the first cylinder assembly 420, the fuel gas from the first cylinder assembly 420 enters the second cylinder assembly 430 through the second fuel discharging tube 414 and the second fuel discharging tube 414a thereof.

The opening degree of the second fuel discharging tube 414 is determined by the movement of the second piston 431 of the second cylinder assembly 430. The movement of the second piston 431 is performed the expansion and contraction of the movement member 510 that expands or contracts according to the physical signal generated from the temperature sensor 140.

In this case, since the movement member 510 abuts on the end of the second piston 431, the second piston 431 moves the left side of the drawing to close the second fuel discharging tube 414 due to the expansion of the movement member 510, or moves the right side of the drawing to open the second fuel discharging tube 414 due to the contraction of the movement member 510. Since the fuel gas discharged from the first cylinder assembly 420 moves the second piston 431 to the right side of the drawing at a certain pressure through the second fuel discharging tube 414, the end of the second piston 431 and the movement member 510 may move to the right side of the drawing while maintaining an abutting state therebetween.

Hereinafter, a configuration of the controller 500 will be described in more detail with reference to FIG. 6.

As shown in FIG. 6, the controller 500 includes the movement member 510 and a location controller 550 for manually controlling the location of the movement member 510.

The location controller 550 manually controls the opening degree of the second fuel discharging tube 414 of the second cylinder assembly 430. The location controller 550 includes an elastic frame 520, a fixing frame 530, a location control lever 540, and a control nut 521. The elastic frame 520 supports the movement member 510 while being fixed on one side of the support block 410. The fixing frame 530 is coupled to the other side of the support block 410. The location control lever 540 penetrates through the fixing frame 530 and include a control bolt 541 screwed to the elastic frame 520 at one side thereof, and includes a grip 542 for rotating the control bolt 541 at the other side thereof. The control nut 521 is coupled to the control bolt 541 between the fixing frame 530 and the elastic frame 520, and is fixed on the elastic frame 520.

As shown in FIG. 6, since the elastic frame 520 is fixed on only one side of the support block 410 and be coupled to the movement member 510, the movement member 510 moves together with the elastic frame 520 when the elastic frame 520 moves in a lateral direction.

The fixing frame 530 is fixed on the other side of the support block 410 in an L-shape. The control bolt 541 of the location control lever 540 is screwed into the elastic frame 520 through the fixing frame 530 at a location where the fixing frame 530 and the elastic frame 520 face each other at the shortest distance.

When the grip 542 of the location control lever 540 rotates in the fastening direction of the screw, the location control lever 540 cannot move upward due to the fixing frame 530. Accordingly, the control nut 521 and the elastic frame 520 fastened to thereto moves to the left side of the drawing.

In this case, the control nut 521 is selectively used to reinforce the use strength. Although the control nut 521 is not provided, it is possible to obtain the same operational effect.

When the initial location of the movement member 510 is set by operating the location controller 550, the opening degree of the second fuel discharging tube 414 of the second cylinder assembly 430 is determined. Thereafter, the movement member 510 is moved by a physical signal of the temperature sensor 140, and thus the opening degree of the second fuel discharging tube 414 is controlled by the second piston 431.

When the temperature of the circulating water loaded in the water reservoir 100 reaches a predetermined temperature, the movement member 510 is expanded by an expansion signal of the temperature sensor 140 to push the second piston 431, allowing a very small amount of fuel gas to flow into the igniter 600 through the second fuel discharging hole 414a even when the second fuel discharging tube 414 is completely closed, thereby enabling the maintenance of the temperature of the circulating water. Hereinafter, a detailed description thereof will be made with reference to FIGS. 7 and 8.

Figure 7:
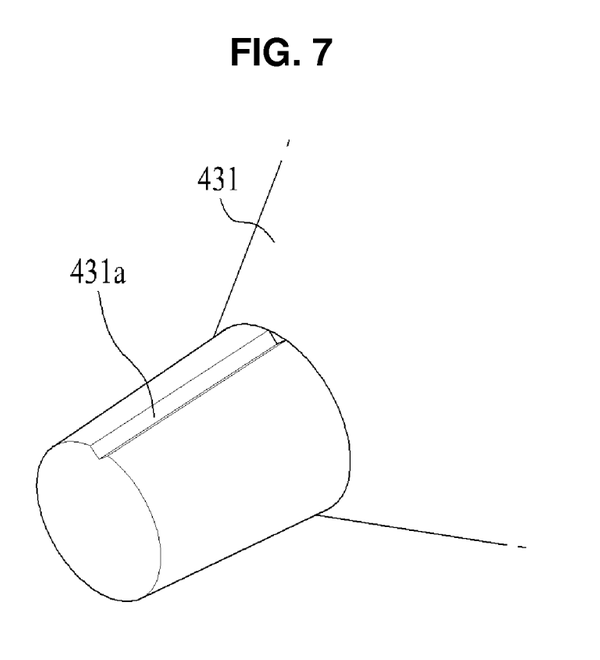
FIGS. 7 and 8 are schematic views illustrating a recessed groove formed in a second piston and a second fuel discharge pipe according to an exemplary embodiment of the present invention.

As shown in FIG. 7, a recessed groove 431a is formed in the front end of the second piston 431 of the second cylinder assembly 430 such that a very small amount of fuel can flow into the second cylinder assembly 430 even when the fuel discharging tube 414 of the second cylinder assembly 430 is closed. Thus, even when the fuel discharging tube 414 of the second cylinder assembly 430 is completely closed, a very small amount of fuel gas flows into the second cylinder assembly 430 through the recessed groove 431a, thereby enabling fuel gas necessary for maintenance of the temperature of the circulating water to be sent to the igniter 600.

Figure 8:
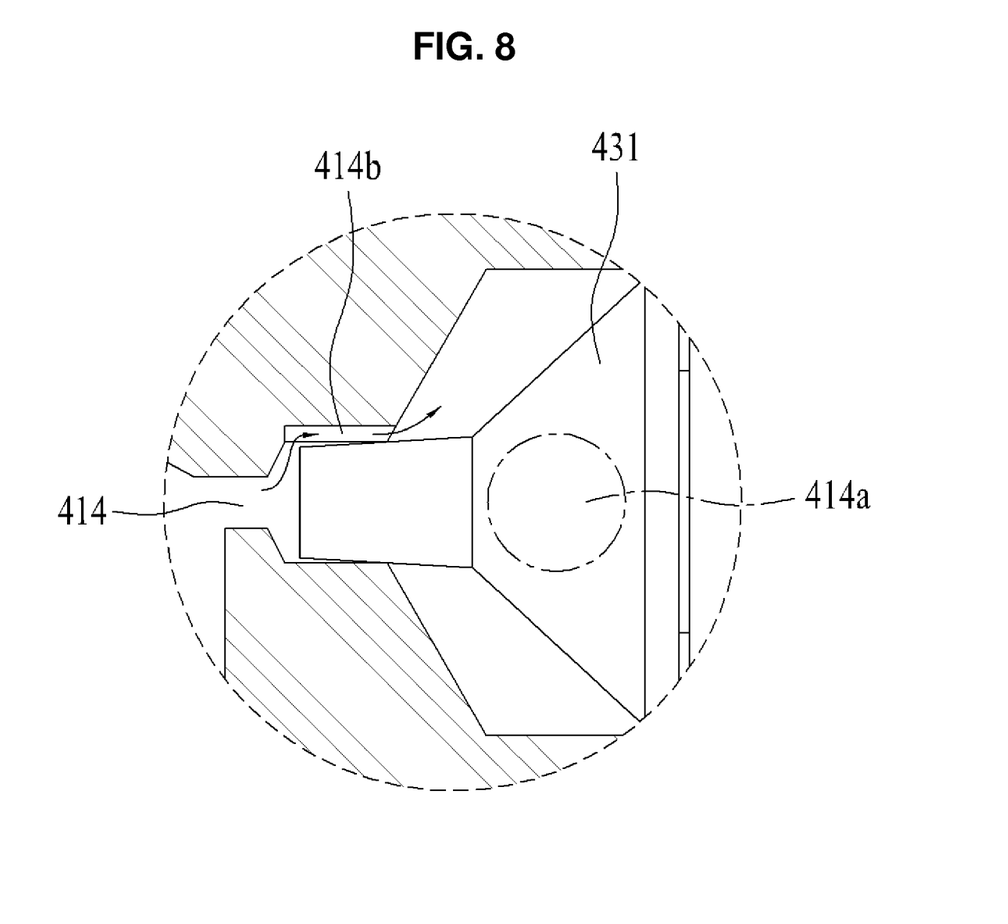

Alternatively, as shown in FIG. 8, a recessed groove 414b may also be formed in the inner circumferential surface of the fuel discharging tube 414 of the second cylinder assembly 430 such that a very small amount of fuel can flow into the second cylinder assembly 430 even when the fuel discharging tube 414 of the second cylinder assembly 430 is closed.

The exemplary embodiments of the portable boiler 1000 for the heating mat 10 have been described to facilitate a better understanding of the present invention, and should not be construed as limiting the technical scope of the present invention.

Also, it will be understood by those skilled in the art that the exemplary embodiments of the present invention can be modified and changed without deviating from the technical spirit of the present invention.

For example, the type of the liquid filled in the temperature sensor 140, the shape or material of the movement member 510, the combination structure of the respective components, and the shape and material of the flow passage included in the heat-transfer part 200 set forth herein should not become criteria that determine the technical scope of the present invention, rather the scope of the present invention should be determined only by claims described later.

The invention claimed is:

1. A portable boiler for a heating mat comprising:
a water reservoir storing circulating water that is received through an inlet tube disposed on one side of an upper portion of the water reservoir;
a heat-transfer part allowing the circulating water to flow along a flow passage to exchange heat and discharging the circulating water to a heating mat through an outlet tube disposed on one side of the heat-transfer part;
a heating part for heating the circulating water inside the heat-transfer part by burning fuel gas supplied from a fuel tank;
a housing defining an exterior of the portable boiler;
a heat-collecting plate on an undersurface of the heat-transfer part to increase thermal conductivity,
wherein the water reservoir comprises:
the inlet tube connected to one end of a circulation pipe buried in the heating mat on the one side of the upper portion of the water reservoir;
a fixing bracket having a plurality of holes to allow the circulating water to flow into the heat-transfer part;
a check valve formed of a thin film and opening or closing the plurality of holes according to a water pressure of the circulating water; and
a temperature sensor sensing a temperature of the circulating water to generate a physical signal using expansion and contraction of a liquid filled therein;
wherein the heat-transfer part has the flow passage that allows the circulating water to absorb heat when the check valve is opened and the circulating water flows therein;
wherein the heating part comprises:
a gas controller for controlling an injection amount of the fuel gas supplied from the fuel tank;
a controller receiving the physical signal from the temperature sensor to control the gas controller; and
an igniter comprising a combustor for burning the fuel gas supplied from the gas controller and a spark plug generating an electric spark on the combustor,
wherein the flow passage of the heat-transfer part comprises:
a vertical flow passage to which the circulating water first flows through the check valve of the water reservoir;
a bypass flow passage detouring the circulating water from the vertical flow passage to one side;
an inclination flow passage communicating with the bypass flow passage and inclining toward the outlet tube,
wherein the portable boiler further comprises a shield plate disposed between the inclination flow passage and the bypass flow passage of the heat-transfer part to prevent heat transferred from the heat-collecting plate from being transferred to the water reservoir through the flow passage.

2. The portable boiler of claim 1, further comprising a plurality of heat-collecting fins radially disposed from a center of the heat-collecting plate to the outside.

3. The portable boiler of claim 1, further comprising a support bracket disposed between the flow passage and the heat-collecting plate of the heat-transfer part to support the flow passage and the heat-collecting plate of the heat-transfer part, the support bracket defines a space between the heat-collecting plate and the inclination flow passage.

4. The portable boiler of claim 1, wherein the check valve is formed using a flexible silicon thin-film and is coupled to one end of a rod penetrating a center of the fixing bracket, and an elastic member is disposed around an outer circumferential surface of the rod and is supported by the other end of the rod and the fixing bracket.

5. The portable boiler of claim 2, wherein the temperature sensor comprises:
a signal generation part submerged in the water reservoir and generating a physical signal that allows expansion or contraction using a liquid filled therein when the temperature of the circulating water loaded in the water reservoir reaches a certain temperature; and
a signal delivery part comprising a capillary tube filled with the liquid to deliver the physical signal to the movement member.

6. The portable boiler of claim 1, wherein the fixing bracket has an ejection hole for discharging vapor generated when the circulating water flows in the heat-transfer part and comprises an air ejector that opens the ejection hole when a pressure of the vapor becomes greater than a certain pressure.

7. A portable boiler for a heating mat comprising:
a water reservoir storing circulating water that is received through an inlet tube disposed on one side of an upper portion of the water reservoir;
a heat-transfer part allowing the circulating water to flow along a flow passage to exchange heat and discharging the circulating water to a heating mat through an outlet tube disposed on one side of the heat-transfer part;
a heating part for heating the circulating water inside the heat-transfer part by burning fuel gas supplied from a fuel tank;
a housing defining an exterior of the portable boiler; and
a heat-collecting plate on an undersurface of the heat-transfer part to increase thermal conductivity,
wherein the water reservoir comprises:
the inlet tube connected to one end of a circulation pipe buried in the heating mat on the one side of the upper portion of the water reservoir;
a fixing bracket having a plurality of holes to allow the circulating water to flow into the heat-transfer part;
a check valve formed of a thin film and opening or closing the plurality of holes according to a water pressure of the circulating water; and
a temperature sensor sensing a temperature of the circulating water to generate a physical signal using expansion and contraction of a liquid filled therein;
wherein the heat-transfer part has the flow passage that allows the circulating water to absorb heat when the check valve is opened and the circulating water flows therein;
wherein the heating part comprises:
a gas controller for controlling an injection amount of the fuel gas supplied from the fuel tank;
a controller receiving the physical signal from the temperature sensor to control the gas controller; and
an igniter comprising a combustor for burning the fuel gas supplied from the gas controller and a spark plug generating an electric spark on the combustor,
wherein the flow passage of the heat-transfer part comprises:

a vertical flow passage to which the circulating water first flows through the check valve of the water reservoir;

a bypass flow passage detouring the circulating water from the vertical flow passage to one side;

an inclination flow passage communicating with the bypass flow passage and inclining toward the outlet tube, wherein the housing has a plurality of first air passages at a location of an outer circumferential surface corresponding to the bypass flow passage of the heat-transfer part in an outer circumferential surface of the housing and a plurality of second air passages at a location of the outer circumferential surface corresponding to the heat-collecting plate.

8. The portable boiler of claim 7, further comprising an auxiliary cover in the housing corresponding to the first air passages, the auxiliary cover having a plurality of auxiliary air passages that selectively open and close the first air passages.

9. The portable boiler of claim 7, further comprising a windproof plate outside the housing corresponding to the plurality of second air passages, the windproof plate preventing a direction of a flame from being biased according to a flow of air received through the second air passages.

10. A portable boiler for a heating mat comprising:

a water reservoir storing circulating water that is received through an inlet tube disposed on one side of an upper portion of the water reservoir;

a heat-transfer part allowing the circulating water to flow along a flow passage to exchange heat and discharging the circulating water to a heating mat through an outlet tube disposed on one side of the heat-transfer part;

a heating part for heating the circulating water inside the heat-transfer part by burning fuel gas supplied from a fuel tank; and a housing defining an exterior of the portable boiler, wherein the water reservoir comprises:

the inlet tube connected to one end of a circulation pipe buried in the heating mat on the one side of the upper portion of the water reservoir;

a fixing bracket having a plurality of holes to allow the circulating water to flow into the heat-transfer part;

a check valve formed of a thin film and opening or closing the plurality of holes according to a water pressure of the circulating water; and a temperature sensor sensing a temperature of the circulating water to generate a physical signal using expansion and contraction of a liquid filled therein;

wherein the heat-transfer part has the flow passage that allows the circulating water to absorb heat when the check valve is opened and the circulating water flows therein;

wherein the heating part comprises:

a gas controller for controlling an injection amount of the fuel gas supplied from the fuel tank;

a controller receiving the physical signal from the temperature sensor to control the gas controller; and an igniter comprising a combustor for burning the fuel gas supplied from the gas controller and a spark plug generating an electric spark on the combustor, wherein the gas controller comprises:

a coupling part coupled to the fuel tank;

a support block comprising a first fuel discharging tube allowing the fuel gas supplied from the fuel tank to be ejected through a first fuel discharging hole;

a first cylinder assembly mounted with a first piston that moves in a cylinder due to a rotation of a control knob screwed into a control screw part formed in the cylinder to open and close the first fuel discharging tube, and disposed on the support block to communicate with the first fuel discharging tube; and a second cylinder assembly mounted with a second piston that slidably moves in a cylinder to open and close a second fuel discharging tube, and disposed on the support block to communicate with the first cylinder assembly and discharge the fuel gas received through the second discharging tube, wherein the controller comprises:

a movement member abutting on an end portion of the second piston of the second cylinder assembly to move the second piston by expanding or contracting due to the physical signal generated by the temperature sensor; and a location controller for controlling a location of the movement member; and wherein the combustor burns the fuel gas received through the second fuel discharging hole of the second cylinder assembly; and wherein the igniter comprises the spark plug generating the electric spark on the combustor.

11. The portable boiler of claim 10, wherein the second piston of the second cylinder assembly has a first recessed groove on a front end of the second piston such that a very small amount of fuel flows into the second cylinder assembly even when the second fuel discharging tube of the second cylinder assembly is closed, and the second fuel discharging tube of the second cylinder assembly has a second recessed groove in an inner circumferential surface of the second fuel discharging tube such that a very small amount of fuel flows into the second cylinder assembly even when the fuel discharging tube of the second cylinder assembly is closed.

12. The portable boiler of claim 10, wherein the location controller comprises:

an elastic frame supporting the movement member while being fixed on one side of the support block;

a fixing frame coupled to the other side of the support block, and a location control lever comprising a control bolt penetrating the fixing frame and screwed into the elastic frame at one end of the location control lever, and a grip for rotating the control bolt at the other end of the location control lever, and a control nut is further provided between the fixing frame and the elastic frame to be coupled to the control bolt and be fixed on the elastic frame.

* * * * *